(12) United States Patent
Russ et al.

(10) Patent No.: US 8,753,440 B2
(45) Date of Patent: Jun. 17, 2014

(54) SYSTEM AND METHOD FOR COOLING A SOLVENT FOR GAS TREATMENT

(75) Inventors: Fredric Samuel Russ, Humble, TX (US); George Frederick Frey, Houston, TX (US); Charles Martin Mitchell, Baytown, TX (US); Paul William Plummer, Humble, TX (US)

(73) Assignee: General Electric Company, Schenectady, NY (US)

( * ) Notice: Subject to any disclaimer, the term of this patent is extended or adjusted under 35 U.S.C. 154(b) by 388 days.

(21) Appl. No.: 13/046,513

(22) Filed: Mar. 11, 2011

(65) Prior Publication Data
US 2012/0227442 A1  Sep. 13, 2012

(51) Int. Cl.
*B01D 47/00* (2006.01)

(52) U.S. Cl.
USPC ............... 96/242; 96/244; 95/228; 95/229; 62/617

(58) Field of Classification Search
None
See application file for complete search history.

(56) References Cited

U.S. PATENT DOCUMENTS

| | | | | |
|---|---|---|---|---|
| 4,715,873 A | * | 12/1987 | Auvil et al. | 62/646 |
| 5,373,699 A | * | 12/1994 | Gastinne et al. | 62/646 |
| 6,324,852 B1 | * | 12/2001 | Cheng | 62/52.1 |
| 2006/0110300 A1 | * | 5/2006 | Mak | 422/190 |

* cited by examiner

*Primary Examiner* — Duane Smith
*Assistant Examiner* — Phillip Shao
(74) *Attorney, Agent, or Firm* — Fletcher Yoder, P.C.

(57) ABSTRACT

The present embodiments are directed towards the cooling of a solvent of a gas treatment system using a fluid flow from an air separation unit. In one embodiment, a system is provided that includes an air separation unit. The air separation unit has an air inlet configured to receive an air flow, an oxygen outlet configured to output an oxygen flow, a nitrogen outlet configured to output a nitrogen flow and a cooling system configured to cool the air flow to enable separation of the air flow into the oxygen flow and the nitrogen flow, wherein the cooling system is configured to cool a first solvent of a first gas treatment system.

10 Claims, 7 Drawing Sheets

SYSTEM AND METHOD FOR COOLING A SOLVENT FOR GAS TREATMENT

BACKGROUND OF THE INVENTION

The disclosed subject matter relates to gas treatment systems, such as acid gas removal (AGR) systems in a gasification system. More specifically, the disclosed subject matter relates to the cooling of a solvent used for the gas treatment system.

Syngas may be produced by the gasification of a feedstock, such as coal, and may be utilized as fuel in a combined cycle power plant. The syngas may generally include a gaseous mixture of carbon monoxide and hydrogen, as well as small amounts of hydrogen chloride, hydrogen fluoride, ammonia, and other gases. Depending on the organic content of the feedstock, the syngas also may include varying amounts of acid gases, such as hydrogen sulfide and carbon dioxide. To reduce air pollution and environmental costs, the syngas may need to be cleaned, or "sweetened," to remove the acid gases prior to combustion within a combined cycle power plant. The acid gas removal process may include the use of a physical solvent, which is cooled to facilitate absorption of the acid gases from the syngas. Unfortunately, the cooling requirement increases costs of the AGR system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an air separation unit. The air separation unit has an air inlet configured to receive an air flow, an oxygen outlet configured to output an oxygen flow and a nitrogen outlet configured to output a nitrogen flow. The air separation unit also has a cooling system configured to cool the air flow to enable separation of the air flow into the oxygen flow and the nitrogen flow, wherein the cooling system is configured to cool a first solvent of a first gas treatment system.

In a second embodiment, a system includes a first gas treatment system. The first gas treatment system has a first gas inlet configured to receive a first untreated gas flow and a first gas outlet configured to output a first treated gas flow. The first gas treatment system also has a first solvent-based treatment system coupled to the first gas inlet and the first gas outlet, wherein the first solvent-based treatment system is configured to remove at least one impurity from the first untreated gas flow with a first solvent to produce the first treated gas flow. The first gas treatment system also has a first cooling system coupled to the first solvent-based treatment system, wherein the first cooling system comprises a first coolant inlet configured to receive a first coolant from a first air separation unit.

In a third embodiment, a method includes circulating a fluid flow between a solvent-based gas treatment system and an air separation unit. The method further includes cooling a solvent of the solvent-based gas treatment system via circulation of the fluid flow.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to techniques for cooling a physical solvent of a gas treatment system using a fluid flow from an air separation unit (ASU). More particularly, embodiments of the present disclosure integrate requirements for cooling in the acid gas removal process and heating/vaporization in the air separation unit. As a general example, a fluid flow in an air separation unit may be used to cool a physical solvent used in acid gas removal to cool improve the physical absorption of acid gases. As used herein, the term "acid gases" includes, but is not limited to, the acid gases hydrogen sulfide and carbon dioxide as well as other sulfur containing compounds. The term "physical absorption" shall mean absorption through a solvent that absorbs the selected component from the syngas stream by physical characteristics and not through a chemical reaction. The term "ASU fluid flow" includes, but is not limited to, any cryogenic stream within the air separation unit, such as liquid air, liquid oxygen, liquid nitrogen or diluent nitrogen, or it may include a vaporized stream such as vaporized nitrogen, vaporized oxygen or vaporized air. In certain embodiments, the ASU fluid flow may exchange heat with (i.e., cool) a solvent flow for the gas treatment system (e.g., AGR system) inside the ASU, inside the gas treatment system, or between the ASU and the gas treatment system.

Figure 1:
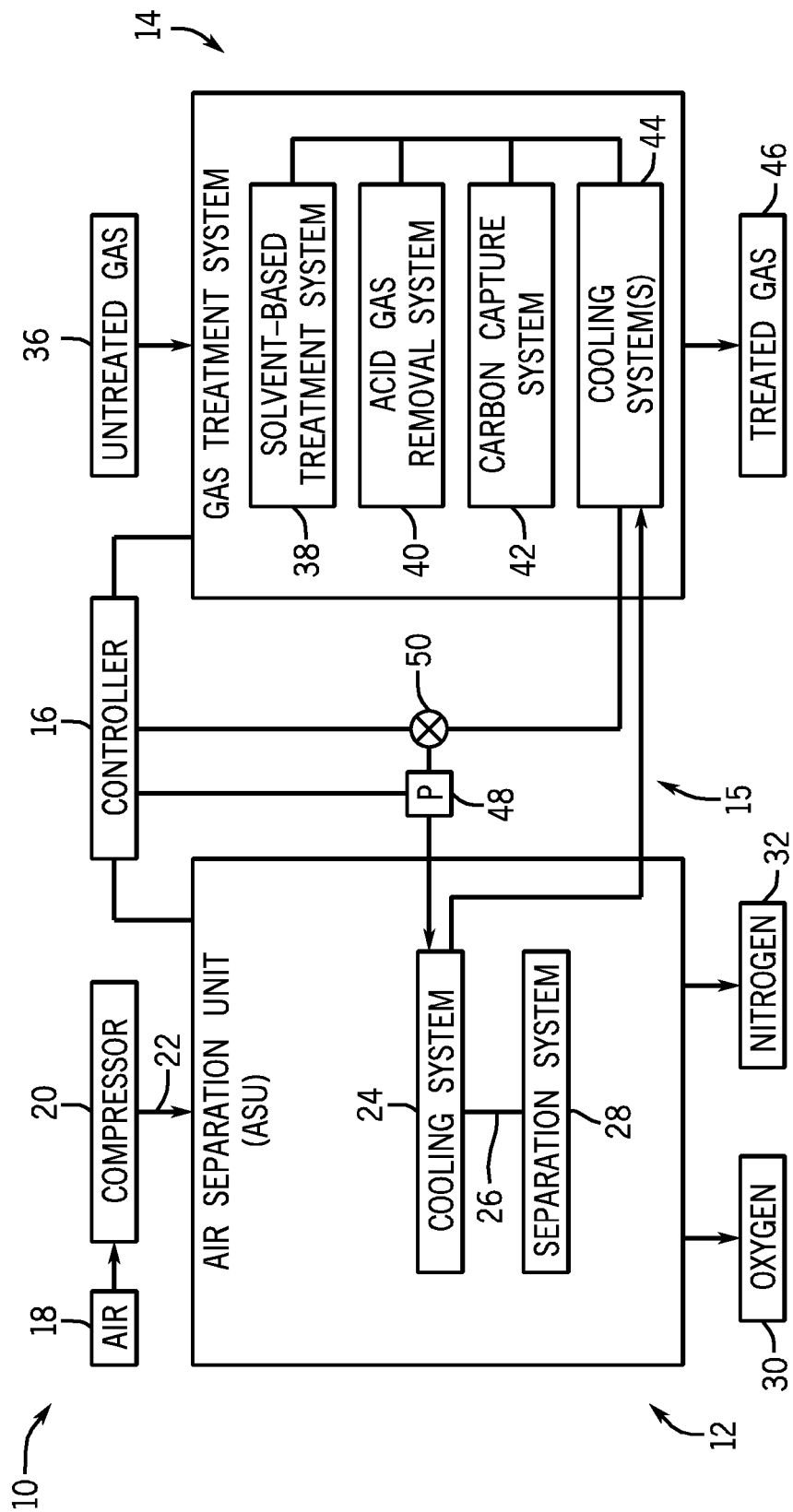
FIG. 1 is a diagram of an embodiment of a system having an air separation unit, a gas treatment system and a controller illustrating a fluid flow between cooling systems of the air separation unit and the gas treatment system.

FIG. 1 is a diagram of an embodiment of a system 10 that includes an air separation unit 12 and a gas treatment system 14. As discussed further below, the air separation unit 12 and the gas treatment system 14 may be configured to exchange a fluid flow 15 between the air separation unit 12 and the gas treatment system 14 to cool a physical solvent of the gas treatment system 14. For example, the fluid flow 15 may include an ASU fluid flow, a solvent flow, or an intermediate fluid flow other than the ASU fluid or solvent. The ASU fluid may include an ASU coolant, and ASU cryogenic fluid, or a liquefied gas, such as liquefied nitrogen, liquefied oxygen, or liquefied air. A controller 16 may serve to control the different flow rates, and thus the heat transfer, to cool the physical solvent. As discussed in further detail below, the heat exchange to cool the physical solvent may be located within the air separation unit 12 within the gas treatment system 14, or between the air separation unit 12 and the gas treatment system 14. For example, the gas treatment system 14 may transfer the solvent to the ASU 12, wherein the ASU fluid transfers heat away from the solvent. By further example, the ASU 12 may transfer an ASU fluid (e.g., a liquefied gas) to the gas treatment system 14, wherein the ASU fluid transfers heat away from the solvent. By further example, the ASU fluid and the solvent may exchange heat between the ASU 12 and the gas treatment system 14. In another example, an intermediate fluid (e.g., water or other cooling medium) may be cooled by the ASU fluid in the ASU 12, flow to the gas treatment system 14, and transfer heat away from the solvent in the gas treatment system 14.

The air separation unit 12 may be used to separate atmospheric air into its primary components, such as oxygen and nitrogen. In general, air 18 is first compressed by a compressor 20. In certain embodiments, a single compressor 20 may be used, while other embodiments may include two or more compressors 20. Thereafter, a compressed air flow 22 enters the air separation unit 12 and is cooled to its liquefaction temperature by a cooling system 24 to create a liquid air flow 26. Subsequently, the liquid air flow 26 is distilled by a separation system 28. The resulting outputs are the two main constituents of atmospheric air 18, oxygen 30 and nitrogen 32. In certain embodiments, the oxygen 30 and the nitrogen 32 outputs may be liquefied. In other embodiments, the oxygen 30 and nitrogen 32 outputs may be vaporized. As will be appreciated, the oxygen output 30 and the nitrogen output 32 may have a variety of temperatures and volumes. As discussed further below, the cooling system 24 may be configured to cool a physical solvent of the gas treatment system 14. Again, the cooling system 24 may receive solvent as the fluid flow 15, cool the solvent in the ASU 12, and return a cooled solvent as the fluid flow 15 back to the gas treatment system 14. Instead, the cooling system 24 may transfer a cooled ASU fluid of an intermediate fluid as the fluid flow 15 to the gas treatment system 14, which uses the cooled fluid flow 15 to cool the solvent in the gas treatment system 14 before returning the warmed fluid flow 15 to the ASU 12.

The gas treatment system 14 may be used to remove acid gases from untreated syngas. As described above, the syngas produced by the gasification of a feedstock may include acid gases, such as hydrogen sulfide and carbon dioxide, which may need to be removed. Untreated syngas 36 is received by the gas treatment system 14 where the untreated syngas 36 may be cleaned by a solvent-based treatment system 38, an acid gas removal system 40, a carbon capture system 42, or a combination thereof. In certain embodiments, the acid gas removal system 40 and/or the carbon capture system 42 may include the solvent-based treatment system 38 to remove unwanted acid gas and/or carbon from the untreated syngas 36. Conversely, the gas treatment system 14 may have a solvent-based treatment system 38 that includes an acid gas removal system 40 and/or a carbon capture system 42. The gas treatment system 14 may further include a cooling system 44. As discussed in further detail below, the cooling system 44 may be configured to exchange the fluid flow 15 with the cooling system 24 of the air separation unit 12. Again, the fluid flow 15 may be the ASU fluid, the solvent, or an intermediate cooling fluid, such that the solvent may be cooled in the ASU 12, the gas treatment system 14, or somewhere in between. Once the untreated syngas 36 passes through the gas treatment system 14 and is cleaned, it is output from the gas treatment system 14 as treated gas 46. The treated gas 46 may then be directed to a power generation system, a chemical production system, or another suitable application.

As mentioned above, the system 10 includes the controller 16 to regulate the different flow rates, and thus the heat transfer, to cool physical solvent. For example, the controller 16 may operate a pump 48 and a flow valve 50 to regulate the flow rate of the fluid flow 15 between the air separation unit 12 and the gas treatment system 14. For example, the controller 16 may increase the speed of the pump 48 and/or the opening of the valve 50 to increase the flow rate of the fluid flow 15, thereby increasing the heat transfer to reduce the temperature of the solvent. The controller 16 also may receive feedback, such as temperature feedback, to facilitate the control to maintain a minimum temperature of the solvent. The controller 16 also may control the ASU 12 and the gas treatment system 13 and/or be controlled by the ASU 12 and the gas treatment system 14. While the illustrated embodiment includes one pump 48 and flow valve 50, other embodiments may include two or more pumps 48 and flow valves 50.

Figure 2:
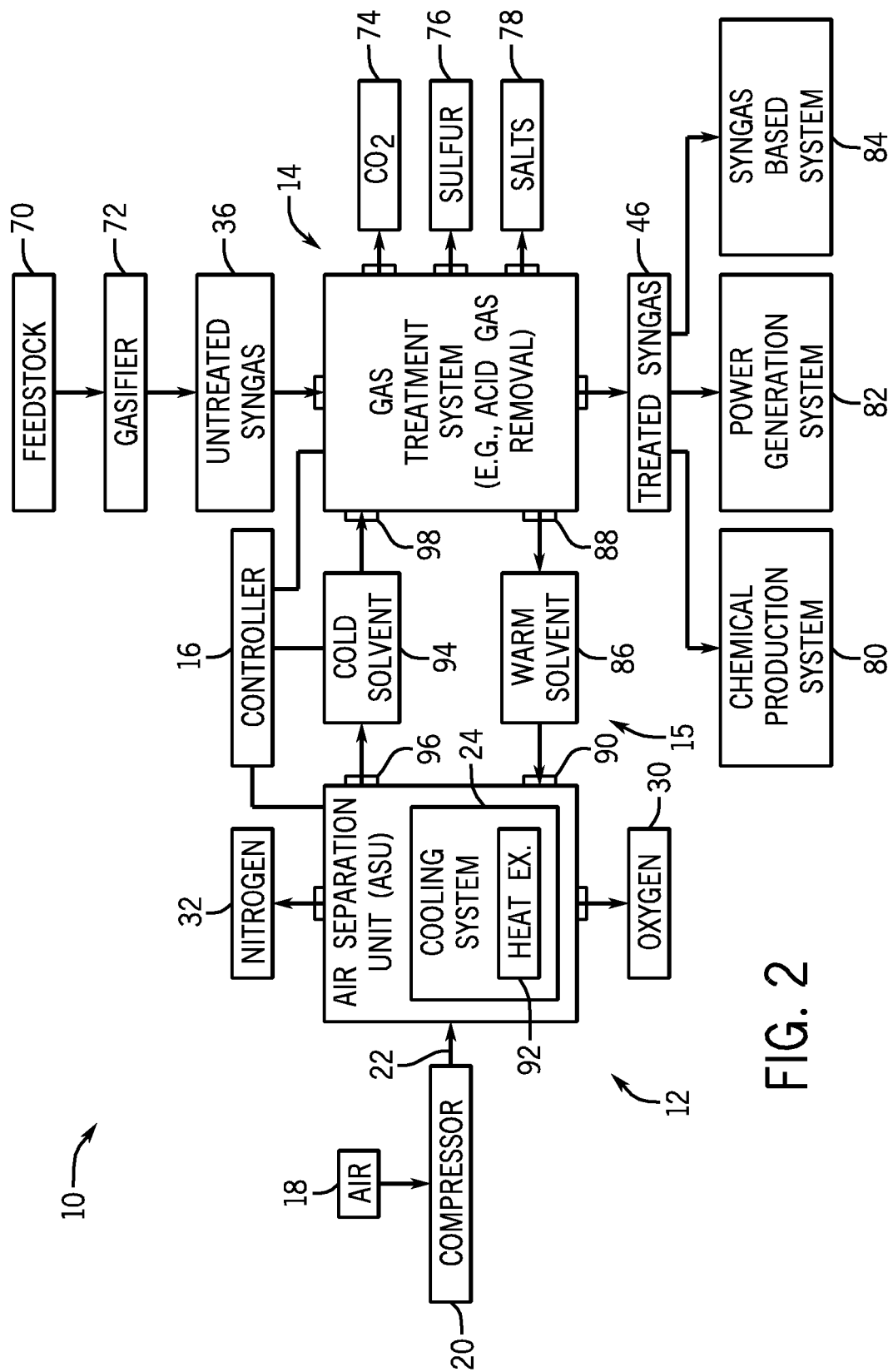
FIG. 2 is a diagram of an embodiment of a system having an air separation unit and, a gas treatment system, and a controller, illustrating a solvent flow between the gas treatment system and a cooling system of the air separation unit.

FIG. 2 is diagram of an embodiment of a system 10 including an air separation unit 12 and a gas treatment system 14. As described above with respect to FIG. 1, atmospheric air 18 is received and compressed by a compressor 20, which outputs a compressed air flow 22. Subsequently, the air separation unit 12 cools the compressed air 22 with a cooling system 24 and separates the compressed air 22 into its two main constituents, oxygen 30 and nitrogen 32. Furthermore, as described above with respect to FIG. 1, the gas treatment system 14 receives untreated syngas 36 and removes selected components from the untreated syngas 36 to produce treated syngas 46. More specifically, the untreated syngas 36 is produced by the gasification of a feedstock 70, such as coal, in a gasifier 72. The untreated syngas 36 may include a gaseous mixture of carbon monoxide and hydrogen as well as varying amounts of acid gases. As shown in the illustrated embodiment, the gas treatment system 14 may remove various components from the untreated syngas 36, such as $CO_2$ 74, sulfur 76 and salts 78. As an example, the gas treatment system 14 may remove sulfur 76 in the form of hydrogen sulfide. Once the treated syngas 46 is output by the gas treatment system 14, it may be utilized as fuel in a combined cycle power plant. For example, the treated syngas 46 may be directed to a chemical production system 80, a power generation system 82 or other syngas based system 84. For example, the treated syngas 46 may be supplied to a gas turbine to drive one or more loads, such as an electrical generator.

As discussed above with respect to FIG. 1, the gas treatment system 14 may include a solvent-based treatment system. Specifically, a solvent within the solvent-based treatment system may selectively absorb acid gases from the untreated syngas 36. For example, the solvent may be a mixture of dimethyl ethers of polyethylene glycol, such as Selexol, commercially available from Dow Chemical Company of Midland, Mich. Once the solvent has absorbed the acid gases from the untreated syngas 36, the solvent undergoes a regeneration process to desorb the acid gases from the solvent. After the acid gases have been desorbed, the solvent, relatively free of acid gases, may again be used to absorb acid gases from the untreated syngas 36. Cooling the solvent increases the efficiency of this acid gas absorption process.

By way of example, in the illustrated embodiment, the air separation unit 12 is configured to receive, cool, and return a flow of solvent for the gas treatment system 14. More specifically, a warm solvent 86 may exit the gas treatment system 14 through an outlet 88 and enter the air separation unit 12 through an inlet 90. Subsequently, the warm solvent 86 may pass through the cooling system 24 of the air separation unit 12. In the illustrated embodiment, the cooling system 24 of the air separation unit 12 includes a heat exchanger 92. While the illustrated embodiment shows one heat exchanger 92 as part of the cooling system 24, alternative embodiments may include two or more heat exchangers 92 within the cooling system 24. As will be appreciated, an ASU fluid flow, such as a cryogenic liquid or other cooled product, from the air separation unit 12 may also be passed through the heat exchanger 92 of the cooling system 24. The ASU fluid flow may be of a variety of pressures and temperatures. Furthermore, the ASU fluid flow may be delivered using high pressure pumps. In certain embodiments, the ASU fluid flow may be liquefied oxygen, liquefied nitrogen, or liquefied air. In other embodiments, the ASU fluid flow may be vaporized oxygen or vaporized nitrogen. Within the heat exchanger 92, heat from the warm solvent 86 is transferred to the ASU fluid flow from the air separation unit 12, thereby producing a cold solvent 94. After passing through the heat exchanger 92 to absorb heat from the warm solvent 86, the ASU fluid flow from the air separation unit 12 may pass as a liquid to a storage unit within the air separation unit 12, as discussed in further detail below. However, as a result of the heat exchange process, the ASU fluid flow may transform from a liquefied gas to a vaporized gas. In such circumstances, the ASU fluid flow may pass through a cold box within the air separation unit 12 prior to storage. Alternatively, the vaporized fluid flow may be directed to a gasifier for consumption within the gasification process. The cold solvent 94 may exit an outlet 96 of the air separation unit 12 and re-enter the gas treatment system 14 through an inlet 98 for continued use in the acid gas removal process.

As illustrated in FIG. 2, the system 10 further includes the controller 16 to regulate the flow rate of the warm solvent 86, the cold solvent 94, or both. Furthermore, the controller 16 may be configured to control a number of operating parameters of the air separation unit 12 and the gas treatment system 14. For example, the controller 16 may regulate the flow rate of untreated syngas 36 into the gas treatment system 14. For further example, the controller 16 may regulate the flow rate of the ASU fluid flow from the air separation unit 12 through the cooling system 24 to achieve a desired temperature for the cold solvent 94.

Figure 3:
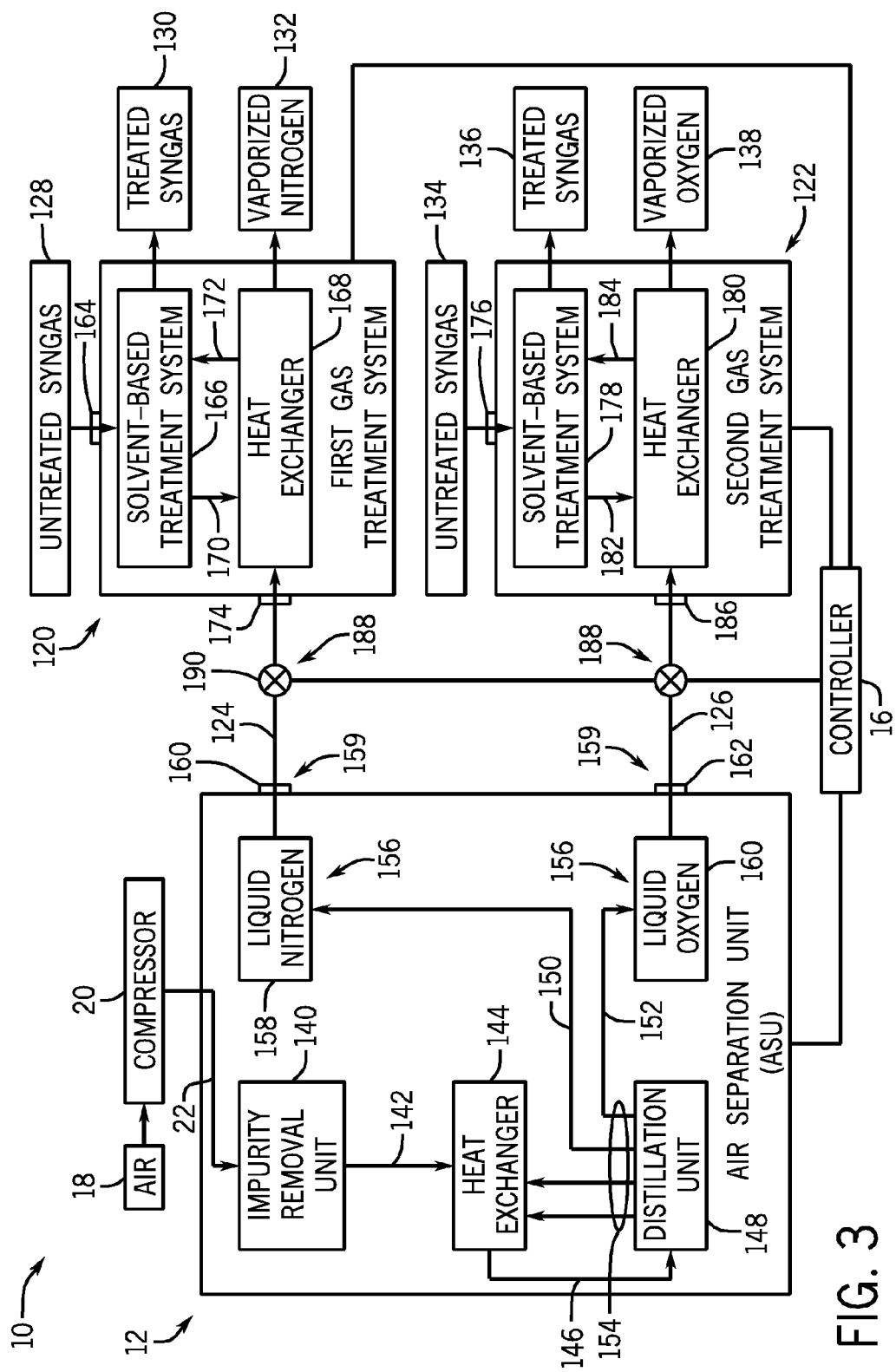
FIG. 3 is a diagram of an embodiment of, a first gas treatment system and a second gas treatment system, each receiving a coolant from an air separation unit.

FIG. 3 is a diagram of an embodiment of a system 10 including an air separation unit 12, a controller 16, a first gas treatment system 120 and a second gas treatment system 122. In general, the air separation unit 12 receives compressed air from a compressor 20, and the air separation unit 12 outputs a liquid nitrogen stream 124 and a liquid oxygen stream 126. The first gas treatment system 120 receives a first untreated syngas 128 and outputs a first treated syngas 130. Furthermore, the first gas treatment system 120 is configured to receive a fluid flow from the air separation unit 12. Specifically, the first gas treatment system 120 receives the liquid nitrogen stream 124 to cool the solvent, and outputs vaporized nitrogen 132. Similarly, the second gas treatment system 122 receives a second untreated syngas 134 and outputs a second treated syngas 136. Furthermore, the second gas treatment system 122 is configured to receive a fluid flow from the air separation unit 12. Specifically, the second gas treatment system 122 receives the liquid oxygen stream 126 to cool the solvent, and outputs vaporized oxygen 138.

In the illustrated embodiment, the compressor 20 receives atmospheric air 18 and outputs a compressed air flow 22. The air separation unit 12 receives the compressed air flow 22. As discussed above, the air separation unit 12 cools the compressed air flow 22 to its liquefaction temperature, and distills the air compressed air 22 into its main constituents, oxygen and nitrogen. More particularly, in certain embodiments, the compressed air 22 may enter the air separation unit 12 and pass through an impurity removal unit 140. As will be appreciated, the impurity removal unit 140 may be configured to remove impurities, such as water vapor and $CO_2$, from the compressed air 22. If such impurities are not removed from the untreated compressed air 22, they may freeze and deposit on the internal surface of process equipment. The impurity removal unit 140 may include a variety of system to remove the impurities from the untreated compressed air 22, which include, but are not limited to, molecular sieves and reversing heat exchangers. In molecular sieves, molecules of the impurities are adsorbed onto surfaces of molecular sieve materials. In reversing heat exchangers, warm air is passed over frozen water and $CO_2$ to evaporate the water and sublime the $CO_2$ to be returned to the atmosphere.

In the illustrated embodiment, treated compressed air 142 is supplied to a heat exchange unit 144, in which cold streams are used to cool the treated compressed air 142. In operation, the heat exchanger 144 is used to transfer heat from the treated compressed air 142 to the cold streams of the air separation unit 12. For example, the heat exchange unit 144 may cool the treated compressed air 142 until it becomes liquefied air 146 at a temperature less than approximately −175 degrees C., −185 degrees C., or −195 degrees C. Next, a distillation unit 148 is used to separate the liquefied air 146 into the desired streams, which may be rich in primarily one component. For example, depending on the number of the desired streams and the desired purities of the streams, the distillation unit 148 may include one or more distillation columns. Specifically, the distillation unit 148 may include a first distillation column that produces a nitrogen rich stream 150, a second distillation column that produces an oxygen rich stream 152, and additional distillation columns for other gases. Other combinations and configurations of distillation columns may be used in other embodiments. For example, one distillation column may produce both the nitrogen rich stream 150 and the oxygen rich stream 152. In addition, the distillation columns of the distillation unit 148 may be trayed or packed.

One or more cold product streams 154 from the distillation unit 148 are then supplied to the heat exchange unit 144 to cool the treated compressed air 142. This heat exchange decreases the temperature of the treated compressed air 142 prior to entering the distillation unit 148. The number of cold product streams 154 may vary depending on the number of distillation columns and/or the number of draw off points from the distillation columns of the distillation unit 148. As further shown in FIG. 3, one or more of the cold product streams 154 may be directed to one or more storage units 156. More specifically, the nitrogen rich stream 150 is supplied to a liquid nitrogen storage unit 158. Furthermore, the oxygen rich stream 152 is supplied to a liquid oxygen storage unit 160. In certain embodiments, the air separation unit 12 may include one storage unit 156 for each unique purity produced by the distillation unit 148. For example, the air separation unit 12 may include one liquid nitrogen storage unit 158 for all nitrogen rich streams 150 produced by the distillation unit 148 and one liquid oxygen storage unit 160 for all oxygen rich streams 152 produced by the distillation unit 148. In other embodiments, the air separation unit 12 may include multiple storage units 156 configured to receive one or more oxygen rich streams 152 or nitrogen rich streams 150. As shown, the air separation unit 12 also includes outlets 159 through which the liquefied gases stored in the storage units 156 may be output. As shown, the air separation unit 12 has a liquid nitrogen outlet 160 through which the liquid nitrogen stored in the liquid nitrogen storage unit 158 may be output from the air separation unit 12. Similarly, the air separation unit 12 has a liquid oxygen outlet 162 through which the liquid oxygen stored in the liquid oxygen storage unit 160 may be output from the air separation unit 12. While the illustrated embodiment shows two air separation unit outlets 159, other embodiments may include more or fewer outlets for other applications.

The outlets 159 are used to deliver liquefied gas as coolants to the first gas treatment system 120 and the second gas treatment system 122. As discussed above, gas treatment systems may receive an untreated syngas, remove selected components from the untreated syngas, and output a treated syngas for use in a combined cycle power plant, or other system. As shown in FIG. 3, the first gas treatment system 120 is configured to receive a first untreated syngas 128 through an inlet 164. The first untreated syngas 128 enters a first solvent-based treatment system 166, where selected acid gases are removed from the first untreated syngas 128. After undergoing the treatment process, the first untreated syngas 128 leaves the first gas treatment system 120 as the first treated syngas 130. As discussed above, cooling of the physical solvent used in the first solvent-treatment system 166 may be achieved with liquefied gas from the ASU 12. For example, the first gas treatment system 120 includes a first heat exchanger 168 configured to receive a first warm solvent 170, transfer heat from the first warm solvent 170 to a coolant, and return a first cold solvent 172 to the first solvent-based treatment system 166. In the illustrated embodiment, the first heat exchanger 168 of the first gas treatment system 120 is configured to receive a coolant from the air separation unit 12. More particularly, the first gas treatment system 120 receives the liquid nitrogen stream 124 from the air separation unit 12. As discussed above, the liquid nitrogen stream 124 may exit the air separation unit 12 through the outlet 160. Subsequently, the liquid nitrogen stream 124 may enter the first heat exchanger 168 of the first gas treatment system 120 through a coolant inlet 174. In operation, the first heat exchanger 168 transfers heat from the first warm solvent 170 to the liquid nitrogen stream 124. The temperature of the liquid nitrogen stream 124 may rise as the liquid nitrogen stream 124 absorbs heat from the first warm solvent 170. As a result, the liquid nitrogen stream 124 may transform into the vaporized nitrogen stream 132 and exit the first gas treatment system 120. In certain embodiments, the vaporized nitrogen 132 may be directed to a gasifier for use in the gasification process. Alternatively, the vaporized nitrogen 132 may be directed back to the air separation unit 12 for cooling and storage.

The second gas treatment system 122 comprises a configuration similar to the first gas treatment system 120. Specifically, the second gas treatment system is configured to receive a second untreated syngas 134 through an inlet 176. The second untreated syngas 134 enters a second solvent-based treatment system 178 where selected acid gases are removed from the second untreated syngas 134. After undergoing the treatment process, the second untreated syngas 134 leaves the second gas treatment system 122 as the second treated syngas 136. As discussed above, cooling of the physical solvent used in the second solvent-treatment system 178 may be achieved with a liquefied gas from the ASU 12. For example, the second gas treatment system 122 includes a second heat exchanger 180 configured to receive a second warm solvent 182, transfer heat from the second warm solvent 182 to a coolant, and return a second cold solvent 184 to the second solvent-based treatment system 178. In the illustrated embodiment, the second heat exchanger 180 of the second gas treatment system 122 is configured to receive a coolant from the air separation unit 12. More particularly, the second gas treatment system 122 receives the liquid oxygen stream 126 from the air separation unit 12. As discussed above, the liquid oxygen stream 126 may exit the air separation unit 12 through the outlet 162. Subsequently, the liquid oxygen stream 126 may enter the second heat exchanger 180 of the second gas treatment system 122 through a coolant inlet 186. In operation, the second heat exchanger 180 transfers heat from the second warm solvent 182 to the liquid oxygen stream 126. The temperature of the liquid oxygen stream 126 may rise as the liquid oxygen stream 126 absorbs heat from the second warm solvent 182. As a result, the liquid oxygen stream 126 may transform into the vaporized oxygen stream 138 and exit the second gas treatment system 122. In certain embodiments, the vaporized oxygen 138 may be directed to a gasifier for use in the gasification process. Alternatively, the vaporized oxygen 138 may be directed back to the air separation unit 12 for cooling and storage.

While the illustrated embodiment shows the air separation unit 12 producing and releasing the liquid nitrogen stream 124 and the liquid oxygen stream 126 for use in cooling a first warm solvent 170 of the first gas treatment system 120 and the second warm solvent 182 of second gas treatment system 122, it is important to note that the air separation unit 12 may produce other coolants, or fluid flows, for use in cooling warm solvents in gas treatment systems. For example, the air separation unit 12 may produce a liquefied air stream, a vaporized nitrogen stream, or a vaporized oxygen stream suitable to cool the solvents in the gas treatment systems 120 and 122. Moreover, while the illustrated embodiment depicts the air separation unit 12 providing a coolant or fluid flow to two gas treatment systems, other embodiments might include an air separation unit 12 providing a coolant or fluid flow to more or fewer gas treatment systems.

As shown in FIG. 3, the system 10 also includes the controller 16 to control one or more valves 188 to control the flow rate of a coolant or fluid flow. The illustrated embodiment shows the controller 16 coupled to a liquid nitrogen flow valve 190 and a liquid oxygen flow valve 192. The controller 16 may be configured to regulate the flow rate of the liquid nitrogen stream 124 and flow rate of the liquid oxygen stream 126, thus regulating the heat transfer between the liquid nitrogen stream 124 and the first warm solvent 170 and the heat transfer between the liquid oxygen stream 126 and the second warm solvent 182. For example, the controller 16 may be programmed to control the flow rate of the liquid nitrogen stream 124, such that the first warm solvent 170 is cooled to a target temperature. Additionally, the controller 16 may be configured to control one or more operating parameters of the air separation unit 12. For example, the controller 16 may be configured to regulate the temperature of the liquid nitrogen storage unit 158 or the liquid oxygen storage unit 160. By further example, the controller 16 may be configured to regulate the flow rate of one or more cold product streams 154 to the heat exchanger 144. Moreover, the controller 16 may be configured to regulate one or more operating parameters of the first gas treatment system 120 and the second gas treatment system 122. For example, the controller 16 may be programmed to regulate the flow rate of the first warm solvent 170 to the first heat exchanger 168, and, thus, regulate the heat transfer between the first warm solvent 170 and a coolant such as the liquid nitrogen stream 124. Similarly, the controller 16 may be programmed to regulate the flow rate of the second warm solvent 182 to the second heat exchanger 180 to similarly regulate heat transfer between the second warm solvent 182 and the liquid oxygen stream 126.

Figure 4:
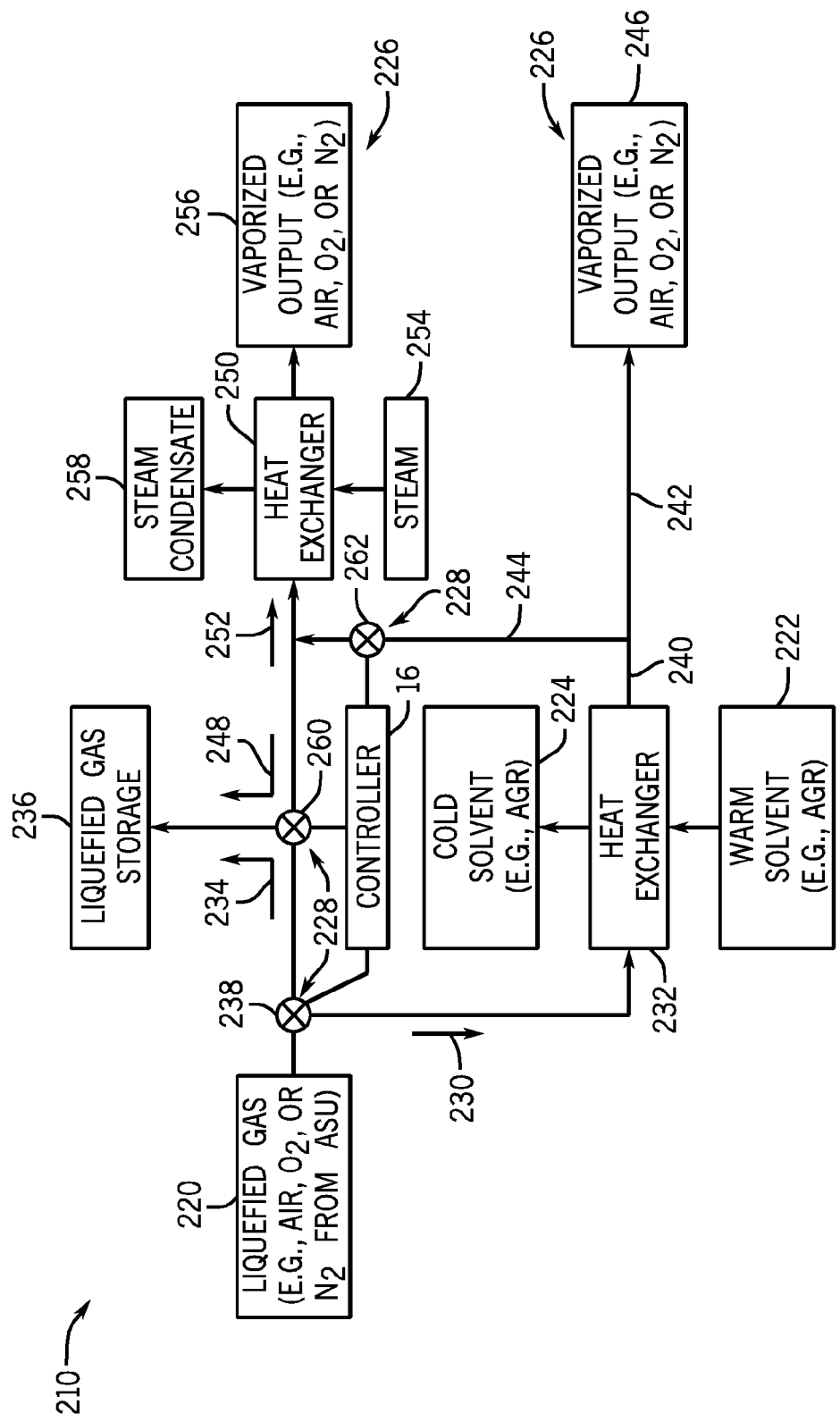
FIG. 4 is a diagram of an embodiment of a cooling system using a liquefied gas to cool a solvent for a gas treatment system.

FIG. 4 is a diagram of an embodiment of a cooling system 210 for a solvent used in an application such as gas treatment. As shown, the cooling system 210 is configured to receive a liquefied gas flow 220 (e.g., liquefied air, liquefied nitrogen, or liquefied oxygen) from an air separation unit 12 and a flow of a warm solvent 222 from a gas treatment system 14. Furthermore, the cooling system 210 includes one or more heat exchangers to transfer heat from the warm solvent 222 to the liquefied gas flow 220. The cooling system outputs a cold solvent 224, which may return to the gas treatment system 14 for further use in the gas treatment process, and at least one vaporized output 226. The cooling system 210 also includes a controller 16, which regulates a plurality of valves 228, pumps, or other operating parameters of the cooling system 210. Thus, the controller 16 is configured to control the heat transfer, and thus cooling of the solvent.

As previously mentioned, the cooling system 210 receives the liquefied gas flow 220 from the air separation unit 12. For example, the liquefied gas flow may be liquefied air, liquefied oxygen or liquefied nitrogen. The liquefied gas flow 220 may flow in a direction 230 and be received by a first heat exchanger 232. The liquefied gas flow 220 also may flow in a direction 234 and be deposited into a liquefied gas storage unit 236. As discussed in further detail below, the direction of the liquefied gas flow may be controlled by a valve 238, which is controlled by the controller 16. The first heat exchanger 232 also receives the warm solvent 222. The liquefied gas flow 220 and the warm solvent 222 exchange heat within the first heat exchanger 232 by transferring heat from the warm solvent 222 to the liquefied gas flow 220. The first heat exchanger 232 outputs the cold solvent 224 that may return to the gas treatment system 14 for further use in the gas treatment process. Furthermore, during the heat exchange process between the warm solvent 222 and the liquefied gas flow 22 within the first heat exchanger 232, a portion of the liquefied gas flow 220 may vaporize due to the heat transferred from the warm solvent 222 to the liquefied gas flow 220. Consequently, the first heat exchanger 232 may release an output flow 240 including a vaporized portion and a liquefied portion. As shown, the cooling system 210 may be configured to direct the flow 240 into a vaporized gas flow 242 and a liquefied gas flow 244. More particularly, the vaporized gas flow 242 may exit the cooling system 210 as a vaporized output 246 and may be supplied to a gasifier of a gasification plant. Additionally, the liquefied gas flow 244 may be directed elsewhere. For example, as shown in the illustrated embodiment, the liquefied gas flow 244 may be returned to the liquefied gas storage unit 236 as shown by arrow 248, or the liquefied gas flow 244 may be directed to a second heat exchanger 250 as shown by arrow 252. The second heat exchanger 250 may also receive a steam flow 254. In certain embodiments, the steam flow 254 may be supplied by a steam generator or other system within an integrated gasification combined cycle (IGCC) power plant. Within the second heat exchanger 250, heat may be transferred from the steam flow 254 to the liquefied gas flow 244. As a result, the second heat exchanger 250 may release a vaporized output 256 and a steam condensate output 258.

As previously mentioned, the cooling system 210 includes the controller 16 to regulate one or more operating parameters or elements of the cooling system 210. For example, the controller 16 may control the plurality of valves 228 to control the fluid flows, and thus heat transfer between the different fluids. For example, the controller 16 may regulate the valve 238 such that the liquefied gas flow 220 is directed to the first heat exchanger 232 at a desired flow rate. By further example, the controller 16 may operate a valve 260 to regulate the direction of flow of the liquefied gas flows 220 and 244 to the liquefied gas storage 236 and/or heat exchanger 250. In other words, the controller 16 may open the valve 260 to allow the flow of the liquefied gas flow 244 to the liquefied gas storage unit 236 in the direction 248. Alternatively, the controller 16 may close the valve 260 to direct the liquefied gas flow 244 to the second heat exchanger 250 in the direction 252. Moreover, the controller 16 may regulate a valve 262 to regulate the liquefied gas flow 244 from the heat exchanger 232 to the liquefied gas storage 236 and/or heat exchanger 250 For example, the valve 236 may open in the presence of liquefied gas flow 244 from the heat exchanger 232, and close in the absence of liquefied gas flow 244 from the heat exchanger 232.

Figure 5:
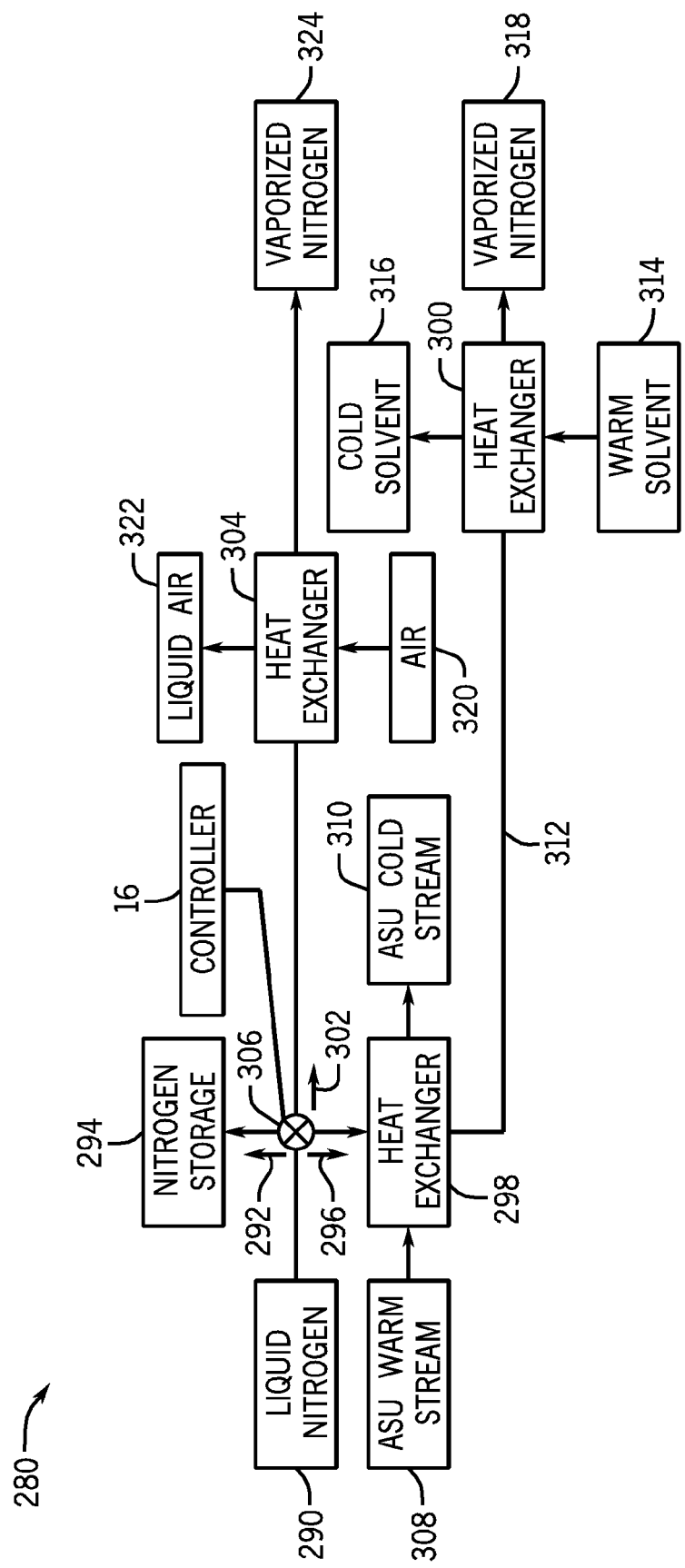
FIG. 5 is a diagram of an embodiment of a cooling system using a liquid nitrogen to cool a solvent for a gas treatment system.

FIG. 5 is a diagram of an embodiment of a cooling system 280 for a solvent used in an application such as gas treatment. The cooling system 280 exchanges heat between a liquefied nitrogen flow 290 (e.g., from an air separation unit 12) and a physical solvent (e.g., from a gas treatment system 12). Further, the cooling system 280 outputs a vaporized gas, which may be directed to a gasifier in the gasification plant, and a cold solvent which may return to the gas treatment system 14 (e.g., AGR system). The cooling system 280 further includes a plurality of heat exchangers and a controller 16, which may control one or more elements or operating parameters of the cooling system 280.

In the illustrated embodiment, the controller 16 is configured to control the liquefied nitrogen flow 290 to flow in a direction 292 to a liquefied nitrogen storage unit 294, in a direction 296 to a first heat exchanger 298 and subsequently a second heat exchanger 300, and/or a direction 302 to a third heat exchanger 304. As shown in the illustrated embodiment, the liquefied nitrogen flow 290 is controlled by a valve 306, which is regulated by the controller 16. In certain embodiments, the valve 306 may be a 6-way valve such that the liquefied nitrogen flow 290 may be directed to flow in a direction 292, 296, 302, or any combination thereof. Moreover, the direction of the liquefied nitrogen flow 290 may be regulated by the controller 16 to achieve certain desired operating condition (e.g., solvent heat transfer rate, liquefied nitrogen flow rate, vaporized nitrogen output rate, etc).

As mentioned above, the liquefied nitrogen flow 290 may be received by a first heat exchanger 298. In the illustrated embodiment, the first heat exchanger 298 also receives a warm stream 308 from the air separation unit 12. The warm stream 308 may comprise atmospheric air, vaporized oxygen, vaporized nitrogen, or any other warm ASU stream. Within the first heat exchanger 298, heat from the warm stream 308 may transfer to the liquefied nitrogen flow 290. As a result, the first heat exchanger 298 outputs a cold stream 310, which may be used by the air separation unit 12 in the separation system 28. The cold stream 310 may be liquefied air, liquefied oxygen, liquefied nitrogen, or any other cold ASU stream. As discussed above, within the first heat exchanger 298, heat from the warm stream 308 may transfer to the liquefied nitrogen flow 290. This may result in the liquefied nitrogen flow 290 transforming into a vaporized nitrogen flow 312. In the illustrated embodiment, the vaporized nitrogen flow 312 is directed to the second heat exchanger 300, which also receives a warm solvent 314 (e.g., from a gas treatment system 14). The vaporized nitrogen flow 312 and the warm solvent 314 exchange heat within the second heat exchanger 300, thereby cooling the warm solvent 314 and heating the vaporized nitrogen stream 312 to produce cold solvent 316 and vaporized nitrogen 318. As will be appreciated, while the vaporized nitrogen stream 312 does not have a temperature as low as the liquefied nitrogen stream 290, the vaporized nitrogen stream 312 is still capable of removing sufficient heat from the warm solvent 314 to improve the gas treatment properties (e.g., acid gas absorption properties) of the solvent. Consequently, the second heat exchanger 300 releases the cold solvent 316, which may return to the gas treatment system 14 for reuse in a gas treatment process (e.g., AGR process). Additionally, the second heat exchanger 300 outputs the vaporized nitrogen flow 318, which may be directed to a gasifier for use in a gasification process.

Alternatively, as mentioned above, the liquefied nitrogen flow 290, or a portion of the liquefied nitrogen flow 290, may be routed in the direction 302 by the valve 306 operated by the controller 16. The liquefied nitrogen flow 290 traveling in the direction 302 is received by the third heat exchanger 304. As shown in the illustrated embodiment, the third heat exchanger 302 also receives an air flow 320. In certain embodiments, the air flow 320 may be atmospheric air, compressed air, untreated air, or another air flow. Within the third heat exchanger 302, the liquefied nitrogen flow 290 absorbs heat from the air flow 320 to produce a liquefied air flow 322 and a vaporized nitrogen flow 324. In certain embodiments, the vaporized nitrogen flow 324 may be directed to a gasifier for use in a gasification process.

Figure 6:
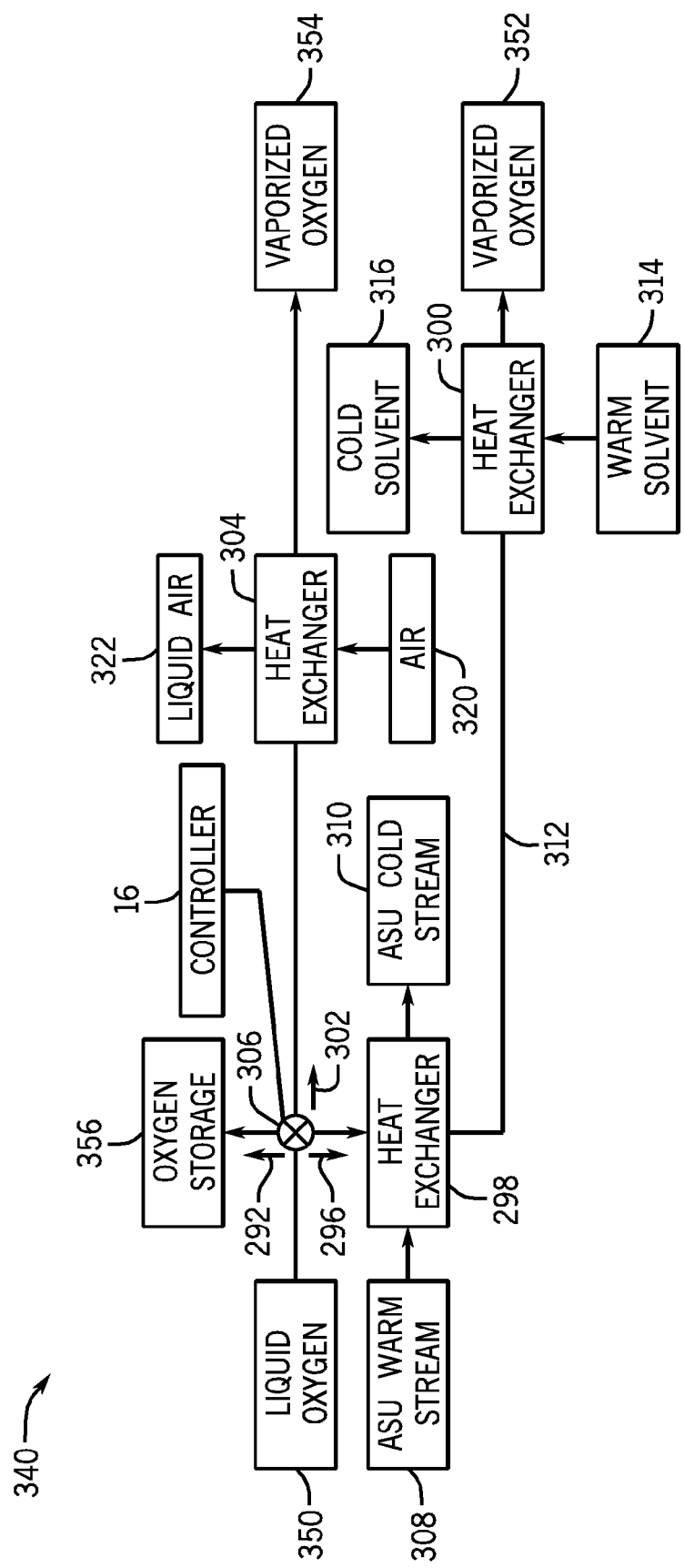
FIG. 6 is a diagram of an embodiment of a cooling system using a liquid oxygen to cool a solvent for a gas treatment system.

FIG. 6 is a diagram of an embodiment of a cooling system 340 using a liquefied oxygen flow 350 (e.g., from the air separation unit 12) to cool a solvent for use in an application, such as gas treatment. The embodiment of FIG. 6 is similar to the embodiment of FIG. 5, except that the cooling system 340 uses the liquefied oxygen flow 350 rather than the liquefied nitrogen flow 290. Similarly, while the embodiment illustrated in FIG. 5 includes vaporized nitrogen outputs 318 and 324, the embodiment illustrated in FIG. 6 has vaporized oxygen outputs 352 and 354. Furthermore, the illustrated embodiment has a liquefied oxygen storage unit 356 rather than the nitrogen storage 294. In other embodiments, the coolant flow to cool the solvent may include liquefied air, liquefied nitrogen, vaporized air, vaporized nitrogen or vaporized oxygen. Additionally, some embodiments may include additional controllers 16, valves 306, heat exchangers, pumps, and equipment to transfer heat away from the solvent to improve the gas treatment system 14. By way of example, the controller 16 may also be configured to regulate the operation of the first heat exchanger 298, the second heat exchanger 300, the third heat exchanger 302, or a combination thereof. For example, the controller 16 may be configured to regulate the first heat exchanger 298 to achieve a desired heat transfer rate between the liquefied oxygen flow 350 and the warm stream 308 to produce the ASU cold stream 310 within a desired temperature and flow rate. Similarly, the controller 16 may be configured to regulate the second heat exchanger 300 to achieve a desired temperature and flow rate of the cold solvent 316. By further example, the controller 16 may be configured to regulate the third heat exchanger 302 to achieve a desired temperature and flow rate of the liquefied air 322.

Figure 7:
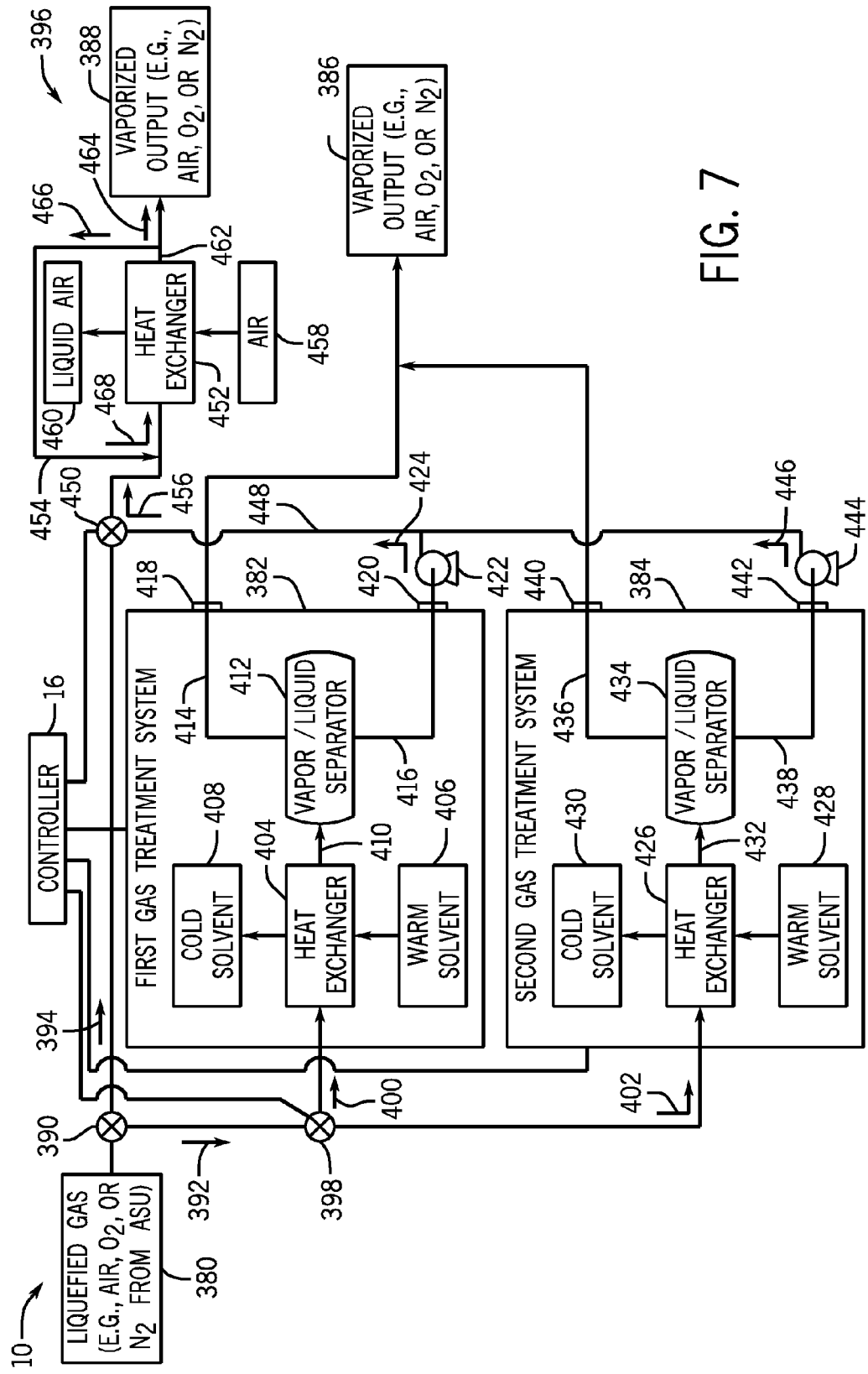
FIG. 7 is a diagram of an embodiment of a first gas treatment system and a second gas treatment system utilizing a liquefied gas flow from an air separation unit to cool a solvent.

FIG. 7 is diagram of an embodiment of a system 10 configured to utilize a liquefied gas flow 380 (e.g., from an air separation unit 12) to cool a solvent of a first gas treatment system 382 and a solvent of a second gas treatment system 384. The system 10 further includes a vaporized output 386, a vaporized output 388, and a controller 16. As discussed in further detail below, the controller 16 may be configured to regulate one or more operating parameters of the system 10 and/or various components of the system 10.

As mentioned above, the system 10 includes the liquefied gas flow 380 from the air separation unit 12. In certain embodiments, the liquefied gas flow 380 may include liquefied air, liquefied oxygen, liquefied nitrogen, or a combination thereof. As shown in the illustrated embodiment, the controller 16 may operate a valve 390 to regulate the flow of the liquefied gas flow 380. For example, the controller 16 and the valve 390 may route the liquefied gas flow in a direction 392 to the first gas treatment system 382 and/or the second gas treatment system 384. The controller 16 and the valve 390 may also route the liquefied gas flow in a direction 394 to a vaporization unit 396.

As mentioned above, the liquefied gas flow 380 may flow in a direction 392 to the first and/or second gas treatment system 382 and 384. Thus, the controller 16 may operate a valve 398 to direct the liquefied gas flow 380 to enter the first gas treatment system 382 as indicated by arrow 400, and/or the second gas treatment system 384 as indicated by arrow 402. As shown, the liquefied gas flow 380 entering the first gas treatment system 382 is received by a first heat exchanger 404, which is also configured to receive a first warm solvent 406 from the first gas treatment system 382. The first heat exchanger 404 transfers heat from the first warm solvent 406 to the liquefied gas flow 380, thereby producing a first cool solvent 408 and a gas flow 410. The first cool solvent 408 may then be reused in the gas treatment process within the first gas treatment system 382. The liquefied gas flow 380, or a portion of the liquefied gas flow 380, may vaporize due to the heat absorbed from the first warm solvent 406 in the first heat exchanger 404. Consequently, the gas flow 410 exiting the first heat exchanger 404 may be a mixture of vaporized gas and liquefied gas. In the illustrated embodiment, the first gas treatment system 382 includes a first vapor/liquid separator 412, which operates to separate the gas flow 410 into a vaporized gas flow 414 and a liquefied gas flow 416. The vaporized gas flow 414 may exit the first gas treatment system 382 through an outlet 418, and may be routed to another system in an IGCC, such as a gasifier. Furthermore, the liquefied gas flow 416 exits the first gas treatment system 382 through an outlet 420. Subsequently, the liquefied gas flow 416 may enter a first pump 422, which may pump the liquefied gas flow 416 to the vaporization unit 396 as indicated by arrow 424.

As mentioned above, the liquefied gas flow 380 may also be received by the second gas treatment system 384. As shown, the liquefied gas flow 380 may enter the second gas treatment system 384 and pass through a second heat exchanger 426. The second heat exchanger 426 is also configured to receive a second warm solvent 428 from the second gas treatment system 384. The second heat exchanger 426 transfers heat from the second warm solvent 428 to the liquefied gas flow 380, thereby producing a second cool solvent 430 and a gas flow 432. The second cool solvent 430 may then be reused in a gas treatment process within the second gas treatment system 384. The liquefied gas flow 380, or a portion of the liquefied gas flow 380, may vaporize due to the heat absorbed from the second warm solvent 428 in the second heat exchanger 426. Consequently, the gas flow 432 exiting the second heat exchanger 426 may be a mixture of vaporized gas and liquefied gas. In the illustrated embodiment, the second gas treatment system 384 includes a second vapor/liquid separator 434, which operates to separate the gas flow 432 into a vaporized gas flow 436 and a liquefied gas flow 438. The vaporized gas flow 436 may exit the second gas treatment system 384 through an outlet 440, and may be routed to another system in the IGCC power plant, such as a gasifier. Furthermore, the liquefied gas flow 438 exits the second gas treatment system 384 through an outlet 442. Subsequently, the liquefied gas flow 438 may enter a second pump 444, which may pump the liquefied gas flow 438 to a vaporization unit 396 as indicated by arrow 446.

In the illustrated embodiment, the liquefied gas flow 416 (arrow 424) and the liquefied gas flow 438 (arrow 446) combine to form a liquefied gas flow 448 to the vaporization unit 396. Additionally, the controller 16 may control a valve 450 to regulate the flow rate of the liquefied gas flow 448 to the vaporization unit 396. As shown, the vaporization unit 396 includes a third heat exchanger 452 and a return stream 454. As indicated by arrow 456, the liquefied gas flow 448 may enter the third heat exchanger 452. The third heat exchanger 452 also receives an air flow 458. In certain embodiments, the air flow 458 may be atmospheric air, compressed air, untreated air, treated air, or another air flow. The third heat exchanger 452 transfers heat from the air flow 452 to the liquefied gas flow 448, thereby producing a liquefied air flow 460 and a gas flow 462. In certain circumstances, the gas flow 462 may include a liquefied gas component and a vaporized gas component. The vaporized gas component may be routed to another system in the IGCC power plant, such as a gasifier, as indicated by arrow 464. The liquefied gas component may be routed to the return stream 454, as indicated by arrow 466. As shown, the return stream 454 may direct the liquefied gas component to re-enter the third heat exchanger 452 of the vaporization unit 396, as indicated by arrow 468, to further cool the air flow 458 and vaporize by absorbing heat from the air flow 458. Furthermore, as previously mentioned, the controller 16 may regulate the valve 390 to direct the liquefied gas flow 380 in the direction 394, to the vaporization unit 396, and the controller 16 may operate the valve 450 to direct the liquefied gas flows 380 and 448 to the vaporization unit 396. Thus, each of the liquefied gas flows 380, 448, and 454 may be used by the vaporization unit 396 and the third heat exchanger 452 to produce the liquid air 460 and the vaporized output 388.

As discussed above, the system 10 includes the controller 16 configured to operate various valves 390, 398 and 450 of the system 10 to control the heat transfer between the various fluids. As shown in the illustrated embodiment, the controller 16 also may be configured to operate one or more operating parameters of the first gas treatment system 382 and/or the second gas treatment system 384. For example, the controller 16 may be configured to regulate the flow rate of the first warm solvent 406 through the first heat exchanger 404 to achieve a desired rate of heat transfer between the first warm solvent 406 and the liquefied gas flow 380. By further example, the controller 16 may be configured to regulate the flow rate of the liquefied gas flow 380 through the second heat exchanger 426 to achieve a desired rate of heat transfer between the second warm solvent 428 and the liquefied gas flow 380. Thus, the controller 16 may be able to improve the efficiency of the gas treatment process (e.g., AGR process) and the gas treatment systems 382 and 384 by providing a suitable flow rate and temperature of the cold solvents 408 and 430.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   an air separation unit, comprising:
   an air inlet configured to receive an air flow;
   an oxygen outlet configured to output an oxygen flow;
   a nitrogen outlet configured to output a nitrogen flow; and
   a cooling system configured to cool the air flow to enable separation of the air flow into the oxygen flow and the nitrogen flow; and
   a controller configured to control one or more coolant flows of the cooling system to cool a first solvent of a first gas treatment system.

2. The system of claim 1, wherein the cooling system comprises a cryogenic cooling system.

3. The system of claim 1, wherein the cooling system comprises a heat exchanger, and the heat exchanger is configured to transfer heat from the first solvent to a first liquefied gas flow.

4. The system of claim 3, wherein the heat exchanger is configured to transfer heat from the first solvent to a liquefied air flow, a liquefied nitrogen flow, or a liquefied oxygen flow, or a combination thereof, as the first liquefied gas flow, and wherein the controller is configured to control the liquefied gas flow such that the first liquefied gas flow vaporizes to form a first vapor flow.

5. The system of claim 1, wherein the cooling system is configured to generate a first liquefied gas flow, and the air separation unit is configured to output the first liquefied gas flow to the first gas treatment system to cool the first solvent.

6. The system of claim 5, wherein the cooling system is configured to generate a liquefied air flow, a liquefied nitrogen flow, or a liquefied oxygen flow, or a combination thereof, as the first liquefied gas flow.

7. The system of claim 1, wherein the controller is configured to control the one or more coolant flows of the cooling system to cool a second solvent of a second gas treatment system.

8. The system of claim 7, wherein the cooling system is configured to cool the first solvent with a first liquefied gas, the cooling system is configured to cool the second solvent with a second liquefied gas, and the first and second liquefied gases are different from one another.

9. The system of claim 1, comprising the first gas treatment system, wherein the first gas treatment system comprises:
   a first gas inlet configured to receive a first untreated gas flow;
   a first gas outlet configured to output a first treated gas flow;
   a first solvent-based treatment system coupled to the first gas inlet and the first gas outlet, wherein the first solvent-based treatment system is configured to remove at least one impurity from the first untreated gas flow with the first solvent to produce the first treated gas flow.

10. The system of claim 9, wherein the first gas treatment system comprises a first acid gas removal system.

* * * * *